(12) United States Patent
Shimizu

(10) Patent No.: US 6,983,264 B2
(45) Date of Patent: Jan. 3, 2006

(54) SIGNAL SEPARATION METHOD AND APPARATUS FOR RESTORING ORIGINAL SIGNAL FROM OBSERVED DATA

(75) Inventor: Junya Shimizu, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 838 days.

(21) Appl. No.: 10/045,271

(22) Filed: Oct. 25, 2001

(65) Prior Publication Data

US 2002/0136328 A1 Sep. 26, 2002

(30) Foreign Application Priority Data

Nov. 1, 2000 (JP) .................................... 2001-335122

(51) Int. Cl.
  *G06F 15/18* (2006.01)

(52) U.S. Cl. ............................................. 706/22; 706/12
(58) Field of Classification Search ................ 706/22
  See application file for complete search history.

(56) References Cited

U.S. PATENT DOCUMENTS

| | | | | |
|---|---|---|---|---|
| 5,293,405 A | * | 3/1994 | Gersbach et al. | 375/232 |
| 5,652,541 A | * | 7/1997 | Yang et al. | 329/300 |
| 5,706,402 A | * | 1/1998 | Bell | 706/22 |
| 5,999,956 A | * | 12/1999 | Deville | 708/322 |

OTHER PUBLICATIONS

Multi–layer Neural Networks WIth A Local Adaptive Learning Rule Ror Blind Separation of Source Signals, by A. Cichocki, W. Kasprzak, S. Amari, International Symposium on Nonlinear Theory And Its Applications (NOLTA '95) Las Vegas, Dec. 10–14, 1995.*

Simon, Haykin, "Ch. 20, Blind Deconvolution ", Adaptive Filter Theory, Second Edition, Prentice Hall (1991), pp. 722–756.*

Simon Haykin, "Ch. 1, The Blind Deconvolution Problem", Blind Deconvolution, (ed.) Prentice Hall (1994), pp. 1–7.*

Sandro Bellini, "Ch. 2, Bussgang Techniques for Blind Deconvolution and Equalization", Blind Deconvolution, S. Haykin (ed.) Prentice Hall (1994), pp. 8–57.*

Simon Haykin, "Ch. 11, Self–Organizing Systems III: Information–Theoretic Models", Neural Networks: A Comprehensive Foundation, S. Haykin (ed.) MacMillan (1994), pp. 444–472.*

(Continued)

*Primary Examiner*—Anthony Knight
*Assistant Examiner*—Michael B. Holmes
(74) *Attorney, Agent, or Firm*—Louis P. Herzberg

(57) ABSTRACT

The present invention provides methods and apparatus to stably separate and extract an original signal from multiple signals by a few calculation steps when multiple signals have been observed in a mixed state. In an example embodiment, signals are separated by introducing a function having a monotonously increasing characteristic like an exponential type function as a cost function, and applying an adaptive algorithm that minimizes that cost function in terms of a signal separation matrix. Then, an error signal $\underline{e}(t)$ is calculated based on $\underline{y}(t)$ formed by this nonlinear function, the estimated separation matrix $\underline{W}(t-1)$ estimated at the previous cycle, and the observed signal $\underline{x}(t)$ at that time. Then, based on the calculated error signal $\underline{e}(t)$, the update of the separation matrix $\underline{W}(t)$ at that time is performed such that consideration weight is increased when estimation errors are large using the cost function having a monotonously increasing characteristic.

35 Claims, 10 Drawing Sheets

OTHER PUBLICATIONS

A New Determination Method for Aigaas/gaas Hbt Large–Signal Model Parameters Using Bias Dependent Noise Parameters and S–ParametersHayama, N.; Shimizu, J.; Honjo, K.; Microwave Conference, 1992. APMC '92. 1992 Asia–Pacific ,vol.: 1 , Aug. 11–13, 1992.*

Adaptive blind signal separation using a risk–sensitive criterion Shimizu, J.; Circuits and Systems, 2001. ISCAS 2001. The 2001 IEEE International Symposium on ,vol.: 2, May 6–9, 2001 pp.:69–72 vol. 2.*

Application of giant magnetostrictive materials to positioning actuators Yamamoto, Y.; Eda, H.; Shimizu, J.; Advanced Intelligent Mechatronics, 1999. Proceedings. 1999 IEEE/ASME Inernational Conference on , Sep. 19–23, 1999 pp.:215–220.*

Blind signal separation and speech recognition in the frequency domainKoutras, A.; Dermatas, E.; Kokkinakis, G.; Electronics, Circuits and Systems, 1999. Proceedings of ICECS '99. The 6th IEEE International Conference on , vol.: 1, Sep. 5–8, 1999.*

Blind signal separation for MA mixture model Xieting Ling; Wei Tian; Bin Liu; Acoustics, Speech, and Signal Processing, 1995. ICASSP–95., 1995 International Conference on , vol.: 5, May 9–12, 1995 pp.:3387–3390 vol. 5.*

Multichannel blind signal deconvolution using high order statistics Moreau, E.; Thirion, N.; Statistical Signal and Array Processing, 1996. Proceedings., 8th IEEE Signal Processing Workshop on (Cat. No.96TB10004, Jun. 24–26, 1996 pp.:336–339.*

Blind signal separation revisited Obradovic, D.; Deco, G.; Decision and Control, 1997., Proceedings of the 36th IEEE Conference on , vol. 2 , Dec. 10–12, 1997 pp.:1591–1596 vol.2.*

* cited by examiner

SIGNAL SEPARATION METHOD AND APPARATUS FOR RESTORING ORIGINAL SIGNAL FROM OBSERVED DATA

FIELD OF THE INVENTION

The present invention relates to signal separation and processing. It more particularly relates to signal separation of an original signal when multiple mixed signals are observed.

BACKGROUND OF THE INVENTION

In some cases, a technique whereby, when multiple mixed signals are observed by multiple sensors, original signals are decided only by using observed signals are more useful than conventional noise reduction methods, and some extensions of the application field can be expected. These fields include, for example, speech enhancement for the reduction of unwanted acoustics during speech recognition, digital communication demodulation in a complex signal environment such as QAM (Quadrature Amplitude Modulation), a medical signal restoration for the extraction of necessary organ information, and a data analysis method whereby an independent component (factor) hidden in statistical data can be extracted.

FIG. 1 depicts a conceptual diagram showing signal separation problems for separating original signals, assuming only the mutually statistical independence of signals when multiple signals are observed in a mixed state. FIG. 1 is formulated as follows. First, assume that there are m signals of scalar values $s_1(t), \ldots, s_m(t)$ for each index t, which are mutually statistically independent and have zero mean. FIG. 1 shows two signal sources $s_1$ and $s_2$ by way of example. For this, n linear weighted sums $x_1(t), \ldots, x_n(t)$ are to be observed, which is expressed as follows and observed by an observation apparatus.

$$\underline{x}(t) = \underline{A}\underline{s}(t) \quad \text{[Equation 1]}$$

where each element is represented as follows.

$$\underline{x}(t) = [x_1(t) x_2(t) \ldots x_n(t)]^T$$

$$\underline{s}(t) = [s_1(t) s_2(t) \ldots s_m(t)]^T \quad \text{[Equation 2]}$$

where it is assumed to be $n \geq m$. Furthermore, assuming that n×m mixing matrix is $\underline{A}$, which is to be a full rank matrix, i.e., a matrix where an inverse matrix of m×m matrix $\underline{A}^H\underline{A}$ exists. Hereinafter, a lowercase letter with an underline represents a vector, an uppercase letter with an underline represents a matrix, a subscript T represents transposition, and a subscript H represents Hermitian conjugate (i.e., conjugate transposition).

A problem of estimating a separation matrix $\underline{W}$ for obtaining a separation signal $\underline{y}(t)$ from this observed signal $\underline{x}(t)$ is a so-called signal separation problem. That is, when obtaining a separation signal $\underline{y}(t) = \underline{W}_H \times \underline{x}(t)$ using a signal separation apparatus from an observed signal $\underline{x}(t)$, which was observed by an observation apparatus shown in FIG. 1, estimation of a separation matrix $\underline{W}$ becomes a problem.

Next, a summary of the concept for estimating a separation matrix $\underline{W}$ will be described. Assuming that a multivariable probability density function of a signal vector serving as observed signal $\underline{x}(t)$ is $p_u(\underline{u})$ and a probability density function for each element of the vector is $p_i(u_i)$, a mutual information of an observed vector is represented by the following Kullback-Leibler divergence.

$$I(\underline{u}) = \int p_u(\underline{u}) \log\left(\frac{p_u(\underline{u})}{\prod_{i=1}^{n} p_i(u_i)}\right) d\underline{u} \quad \text{[Equation 3]}$$

where the mutual information is always positive and when it is zero shows that the elements of each signal vector are independent. In fact, if the signal vector elements are independent each other, the density function of the signal vector is represented by the following equation, so that the above equation becomes zero.

$$p_u(\underline{u}) = \prod_{i=1}^{n} p_i(u_i) \quad \text{[Equation 4]}$$

Therefore, one of the rationales of signal separation technique is that the original signals are able to be restored from the mixed observed signals by finding a transformation matrix that minimizes the mutual information of signal vectors for observed signal vectors.

However, as the probability distribution of original signals is practically unknown, the mutual information can not be made directly to be an object of minimization operation. Therefore, the signal separation is often performed by optimizing a valuation amount that is equal or approximately equal to the mutual information. For example, Reference 1 "International Journal of Neural Systems", vol. 8, Nos. 5 & 6, pp. 661–678, October/December 1997, describes that a mutual information is able to be minimized if finding a transformation matrix $\underline{W}$ that optimizes the sum of the fourth-order cumulants with a zero time delay for each original signal (i.e., maximizing if the kurtosis is positive or minimizing if the kurtosis is negative), on the condition that the observed signals have a kurtosis with the same sign, a covariance matrix is bounded, whitening has been performed, and a separation matrix $\underline{W}$ is a unitary matrix (i.e., $\underline{W}^H\underline{W} = \underline{I}$(unit matrix)). Note that the kurtosis refers to a numeric obtained by the following calculation for an observed signal $u_i$.

$$E\{u_i^4\} - 3[E\{u_i^2\}]^2 \quad \text{[Equation 5]}$$

where $E[\cdot]$ represents an expectation operation. The whitening means making signal vectors uncorrelated each other to make the variance 1, the fourth-order cumulant is a statistic represented by the following equation.

$$\begin{aligned}c_4(k_1, k_2, k_3) = &E\{u_i(t)u_i(t+k_1)u_1(t+k_2)u_i(t+k_3)\} - \\ &E\{u_i(t)u_i(t+k_1)\}E\{u_1(t+k_2)u_i(t+k_3)\} - \\ &E\{u_i(t)u_i(t+k_2)\}E\{u_1(t+k_1)u_i(t+k_3)\} - \\ &E\{u_i(t)u_i(t+k_3)\}E\{u_1(t+k_1)u_i(t+k_2)\}\end{aligned} \quad \text{[Equation 6]}$$

The zero time delay means that $k_1$, $k_2$ and $k_3$ are zero in the above equation.

However, generally, as a load of calculation is heavy when calculating high order statistics such as cumulants, a technique is employed such as calculating and approximating another information amount equivalent to a mutual information or minimizing a cost function equivalent to what optimizes the sum of cumulants by introducing a nonlinear function that can approximate the fourth-order cumulants. U.S. Pat. No. 5,706,402 discloses a method for finding a separation matrix by the gradient method using an unsupervised learning algorithm that optimizes output entropy instead of minimization of mutual information.

Though Reference 2 (Signal Processing, vol. 24, No. 1, pp. 1–10, July 1991) does not manifest mutual information and cumulants, it discloses a method for using an approach similar to it, wherein a square of the residual that results from subtracting a linear sum of estimated signals from the observed signal is made to be a cost function and finding a separation filter that minimizes the cost function by the gradient method. Moreover, Japanese Unexamined Patent Publication No. 2000-97758 discloses a method for improving the convergence by normalizing updated amounts of the above method.

Reference 3 (IEEE Transactions on Signal Processing, vol. 44, No. 12, pp. 3017–3030, December 1996) proposes an estimation method, wherein a nonlinear function that approximately finds the fourth-order cumulants is introduced, then updated amounts to optimize the cost function in an adaptive algorithm based on that nonlinear function are determined based on the relative gradient. This technique improves the convergence speed of the conventional adaptive algorithm, which uses a gradient of the cost function as the updated amount, and which is equivalent to the natural gradient that may be introduced from information geometric considerations.

Stability in the convergence process of the separation matrix is important when restoring signals not in a steady state. In fact, in a series of gradient methods described above, it is often the case that the relation between the convergence speed and the stability is an inverse proportion. Thus, U.S. Pat. No. 5999956 uses a method that adds a module for reducing the effect on the estimation process even when there is a big change of power between estimated signals, and outputting stable results, in addition to a signal estimation module and a separation coefficient estimation module in order to achieve a stable convergence.

Furthermore, Reference 4 (International Journal of Neural Systems, vol. 8, No. 5 & 6, pp. 601–612, October/December 1997) derives an adaptive algorithm based on the least squares method instead of the gradient method, when optimizing a cost function that introduced nonlinear function. Using this approach, as a step-size is not determined by a user like in the gradient method and what is optimal is determined automatically, the convergence speed is enhanced and the stability is achieved under a given condition.

Like the technique of Reference 4 above, within the framework of the least squares method, it has been considered that a fast and appropriate convergence is often achieved, since a step-size is calculated to be optimal under the cost function. However, there is not necessarily the conformance between the situation where the signal separation is required and the format of the cost function which the above prior art techniques including the gradient method have been employed, so that there is a case where it seems not to be best even when using the framework of the least squares method.

For example, for a portable information device, it is assumed that signal observation apparatuses are close to each other because a large area can not be obtained for the installation of apparatuses. At this time, it is easily assumed that the original signals can be mixed at a similar ratio by the observation apparatuses. When this mixing ratio is represented as a matrix element, the elements in each column (or each row) have substantially the same value.

In such a case, as the condition number of the mixing matrix becomes large, the perturbation in the estimation process of the separation matrix would have large effects in estimates. Note that the condition number refers to an amount defined by $\|\underline{Z}\| \cdot \|\underline{Z}^{-1}\|$ using some norm $\|\cdot\|$ for a matrix $\underline{Z}$, where $\underline{Z}^{-1}$ represents an inverse matrix of a matrix $\underline{Z}$.

Therefore, in the conventional format of the cost function, much time is spent for obtaining normal estimates when the perturbation is large, which is likely to be a problem. Further, it is another problem that when the condition number is not large, the convergence speed becomes slower than the conventional cost function in the stage where errors still remain in the estimation process.

SUMMARY OF THE INVENTION

To resolve the above technical problems, it is one aspect of the present invention to stably extract, using only a small number of calculation steps, the original signals from multiple mixed signals that are observed.

It is another aspect of the present invention to provide a fast convergent, least squares type calculation method, based on the cost function, that when the perturbation affecting an estimated value is large, this change is reflected by proper weighting for signal separation.

BRIEF DESCRIPTION OF THE DRAWINGS

These and other aspects, features, and advantages of the present invention will become apparent upon further consideration of the following detailed description of the invention when read in conjunction with the drawing figures, in which.

DESCRIPTION OF THE SYMBOLS

Figure 1:
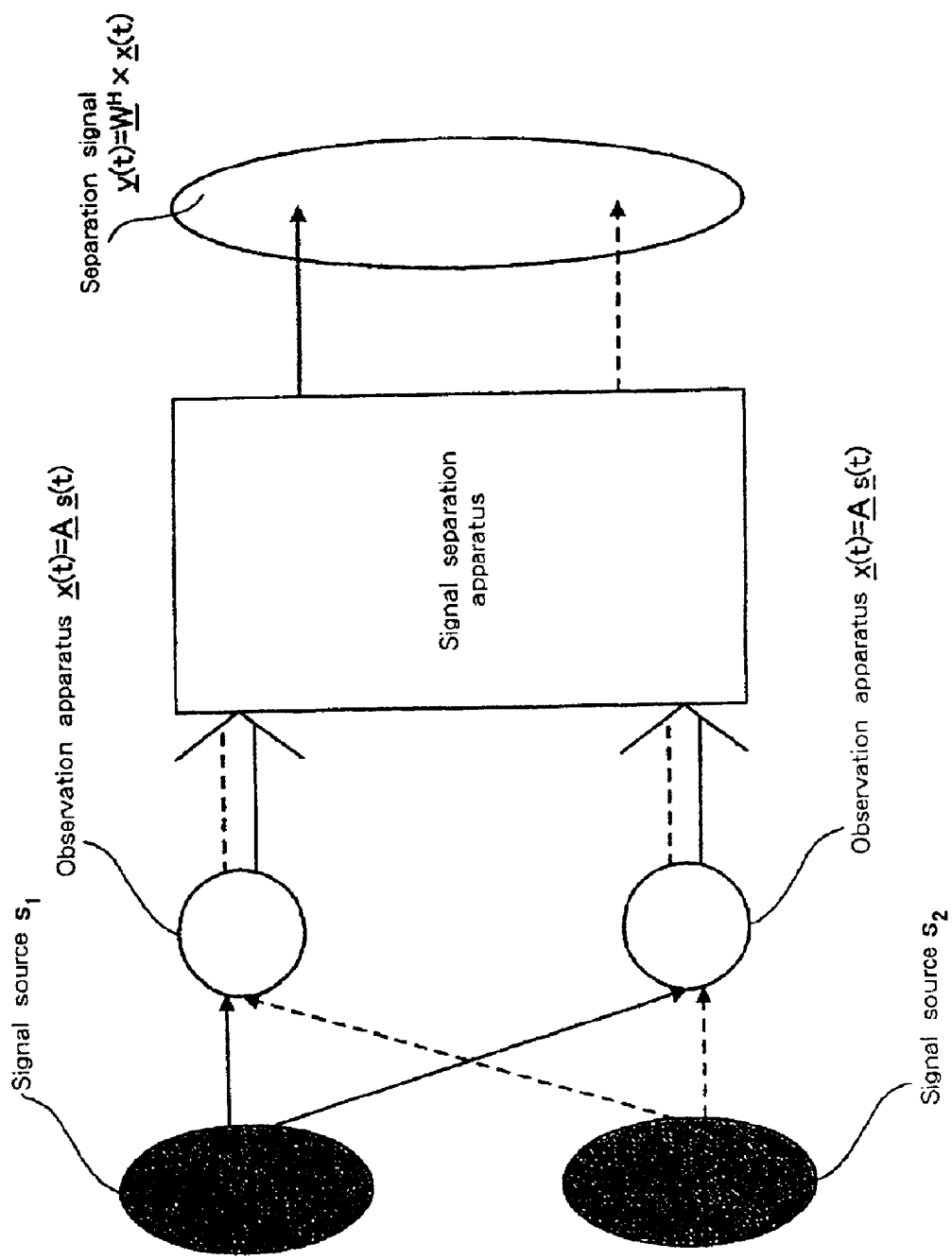
FIG. 1 depicts a conceptual diagram showing signal separation problems.

21: Nonlinear function
22: Calculation of error signal $\underline{e}(t)$
23: Update of $\underline{W}(t)$
24: Unitarization operation
25: Calculation of $\underline{h}(t)$
26: Calculation of $\underline{g}(t)$ and $\xi$
27: Calculation of $\underline{P}(t)$ 31: Estimation filtering of $\underline{W}_1(t)$
32: Estimation filtering of $\underline{W}_2(t)$
33: Estimation filtering of $\underline{W}_m(t)$
41: Nonlinear function
42: Calculation of error signal $\underline{e}_i(t)$
43: Update of $\underline{W}_i(t)$
45: Update of $\underline{X}_{i+1}(t)$
46: Calculation of $\xi$
47: Calculation of $\underline{d}_i(t)$

DESCRIPTION OF THE INVENTION

To achieve these aspects, according to the present invention, an adaptive algorithm is employed for introducing a function, such as an exponential type function having a monotonously increasing characteristic, as a cost function that provides effects equivalent to the minimization of the mutual information for observed signals, and for minimizing (optimizing) the cost function relative to a signal separation matrix. The results acquired from the optimization of the exponential type function are equivalent to those acquired through the optimization of the H-infinity norm and the solution of the two-person zero-sum game in the game theory, that is, the solution of so-called MinMax strategy. Thus, the signal separation matrix can also be estimated using the adaptive algorithm that employs the H-infinity norm and MinMax strategy. That is, according to the present invention, a signal separation method for restoring an original signal from observed data (observed signals), obtained by observing multiple mixed signals, comprises the steps of: estimating, from the observed data, a separation matrix using an adaptive filter that suppresses the H-infinity norm concerning the separation matrix until the H-infinity norm is to equal to or smaller than a provided scalar value; and restoring the original signal by multiplying the separation matrix by the observed data.

The signal separation method of this invention further comprises the steps of: selecting, for the observed data, a specific separation matrix from among multiple separation matrixes based on MinMax strategy in game theory; and restoring an original signal by multiplying the selected separation matrix by the observed data.

That is, the signal separation method of this invention can be an optimization method for, based on the MinMax strategy of game theory, selecting as a solution a separation matrix to which is output a minimum error value selected from among maximum error values that are output to various separation matrixes.

Further, a signal separation method for estimating and restoring an original signal from observed data obtained by observing multiple mixed signals, which include the original signal, comprises the steps of: introducing, for the observed data, a cost function based on a function having a monotonously increasing characteristic; estimating a separation matrix using an adaptive filter that optimizes the cost function; and estimating and restoring the original signal by multiplying the separation matrix by the observed data.

For the estimate of the separation matrix, an adaptive filter is employed for minimizing the cost function for the separation matrix, and the cost function to be introduced is an exponential type function. With these functions, even when large perturbation is applied to the estimated value during the process for estimating the separation matrix, the time used to obtain a correct estimated value can be reduced.

A signal separation method for this invention comprises the steps of: reading observed signals; subtracting the average of the observed signals and performing zero averaging for the observed signals; whitening the observed signals obtained by zero averaging; separating the whitened observed signals based on a cost function that has a monotonously increasing characteristic; and performing, as a post processing, inverse whitening for the obtained observed signals. A non-linear function to be used in the cost function employed for the separation is changed, based on the kurtosis of the observed signal.

A signal processing apparatus according to the invention comprises: input means, for receiving observed data obtained by observing multiple mixed signals, which include an original signal; separation matrix estimation means, for estimating, for the observed data, a separation matrix using adaptive filtering for suppressing the H-infinity norm concerning the separation matrix until the H-infinity norm is to equal to or smaller than a provided scalar value; and estimation/restoration means, for estimating and restoring the original signal by multiplying the separation matrix by the observed data.

A signal processing apparatus for this invention comprises: input means, for receiving observed data obtained by observing multiple mixed signals, which include an original signal; selection means, for employing, for the observed data, the MinMax strategy in game theory to select, for example, a separation matrix that outputs a minimum error selected from among maximum errors output from separation matrixes; and estimation/restoration means, for estimating and restoring an original signal by multiplying the separation matrix by the observed data.

A signal processing apparatus for this invention comprises: separation matrix estimation means, for estimating, for input observed data, a separation matrix by using an adaptive filter with optimizing a cost function that is based on a function, such as an exponential type function, having a monotonously increasing characteristic, e.g., for minimizing the cost function for the separation matrix; and estimation/restoration means, for estimating and restoring an original signal by multiplying the separation matrix by the observed data.

From another viewpoint, according to the invention, a signal processing apparatus, for separating an original signal from an input observed signal and outputting the original signal, comprises: a non-linear function unit, for performing a non-linear function for an input observed signal and a separation matrix estimated during the previous cycle; an error signal calculator, for calculating an error signal based on the value obtained by the non-linear function unit, the separation matrix estimated during the previous cycle, and an observed signal at the present time; and a separation matrix update unit, for updating the separation matrix estimated at that time based on the error signal, so that error evaluation is weighted by the cost function having the monotonously increasing characteristic.

It is advantageous, because accuracy is improved, that the signal processing apparatus further comprise a unitarization operator (a quadrature operator for a real number signal) for ensuring the transform to a unitary matrix (a quadrature matrix for a real number signal) of the estimated separation matrix that has been updated by the separation matrix update unit at that time.

Furthermore, according to the invention, a signal processing apparatus, for separating multiple mixed speech signals that are observed when, for example, multiple speakers are speaking simultaneously, comprises: input means, for receiving mixed speech data; separation matrix estimation means, for estimating a separation matrix, for the mixed speech data, using an adaptive filter with optimizing a cost function that is based on a function having a monotonously increasing characteristic; and separation/extraction means, for separating and extracting the speech signals from the mixed speech data by multiplying the separation matrix by the mixed speech data. According to this aspect, the speech of a single, targeted speaker can be accurately extracted, regardless of whether other, included signals are those produced by the speech of other speakers or are those produced by environmental noise. This provides an effective pre-processing, such as is required for speech recognition.

According to the invention, a signal processing apparatus for separating an artifact, such as the mixing of potential changes, from an observed bio-signal that, at the least, is either a signal observed using magnetoencephalography (MEG) or electroencephalography (EEG), comprises: input means, for receiving observed data containing the artifact in the observed bio-signal; separation matrix estimation means, for estimating a separation matrix for the observed data, using an adaptive filter with optimizing a cost function that is based on a function having a monotonously increasing characteristic; and separation/extraction means for separating and extracting the observed bio-signal from the observed data by multiplying the separation matrix by the observed data. According to these inventions, even when the mixing process is unknown, it can be expected that a brain active potential signal will be accurately extracted, without removing the original brain waves.

According to another aspect of the invention, a signal processing apparatus for extracting, from economic statistical data, a fluctuation element that is hidden during the observation process, comprises: input means, for receiving economic statistical data; separation matrix estimation means, for estimating a separation matrix for the economic statistical data using an adaptive filter with optimizing a cost function that is based on a function having a monotonously increasing characteristic; and separation/extraction means, for separating and extracting the fluctuation element from the economic statistical data by multiplying the separation matrix by the economic statistical data.

The economic statistical data, received by the input means, is management data that can be considered as the data that consists of the overall trend and individual factors synthesized by an unknown mixing matrix. Thus, this invention can be used for the extraction of the main factor that affects cash flow, for example.

The economic statistical data are stock price fluctuation data that are observed as a set, and the fluctuation element that is separated and extracted by the separation/extraction means is a stock price trend for an independent component that can be applied for portfolio return prediction. With this arrangement, for the investment division determinations performed in the financial field, the main factor affecting a fluctuation in stock prices can be analyzed more accurately, and the time used to estimate the main factor can be reduced considerably.

According to the invention, a mobile terminal device, for receiving, from a base station for code division multiple access, observed data that include the spread information to other users, and for extracting a local user signal from the observed data, comprises: input means, for receiving observed data from the base station; separation matrix estimation means, for estimating a separation matrix for the observed data using an adaptive filter with optimizing a cost function that is further based on a function having a monoto-nously increasing characteristic; and separation/extraction means, for separating and extracting a user signal from the observed data by multiplying the separation matrix by the observed data. According to this aspect, an affect due to fading, or due to a signal from another user whose spread code is unknown, can be modeled as the coefficient of a mixing matrix, and the target user signal can be separated only from the received observed data.

A storage medium is provided on which a computer stores a computer-readable program that permits the computer to perform: a process for introducing, for observed data obtained by observing multiple mixed signals, including the original signal, a cost function that is based on a function having a monotonously increasing characteristic; a process for estimating a separation matrix using an adaptive filter that optimizes the cost function; and a process for estimating and restoring the original signal by multiplying the separation matrix by the observed data.

This program also permits a computer to perform: a process for estimating, for observed data obtained by observing multiple mixed signals, which include an original signal, a separation matrix through adaptive filtering for suppressing the H-infinity norm concerning the separation matrix until the H-infinity norm is to equal to or smaller than a provided scalar value; and a process for restoring the original signal by multiplying the separation matrix by the observed data.

The program also permits a computer to perform: a process for selecting from observed data obtained by observing multiple mixed signals, which include an original signal, a specific separation matrix from among separation matrix candidates based on the MinMax strategy in game theory; and a process for restoring an original signal by multiplying the separation matrix by the observed data.

The storage medium can be, for example, a CD-ROM, and the program can be read by the CD-ROM reader of a computer and stored on the hard disk of the computer, for example, and executed.

Advantageous Embodiment

An advantageous embodiment will now be described in detail while referring to the accompanying drawings. A signal separation method according to this embodiment can be applied for a field for reducing an artifact from an observed bio-signal produced by magnetoencephalography (MEG) or electroencephalography (EEG). This method can also be applied for speech enhancement for the reduction of unwanted acoustics during a speech recognition process, or for signal separation or interference reduction during digital communication, such as QAM (Quadrature Amplitude Modulation). Further, the method can be applied for the reduction of an interference set up by down-link signals that serve as links from a base station to individual mobile terminals for CDMA (Code Division Multiple Access), or for the extraction of a mobile terminal user signal. Or the method can be used as a data analysis method for the extraction of an important fluctuation element (factor), such as a stock price fluctuation, that is hidden from economic statistical data during the observation process, or for portfolio management in the financial field. That is, the signal separation method of this embodiment can be widely applied for problems that require the separation of an original signal from general, one-dimensional mixed signals that are observed, regardless of whether these signals are digital observed signals or analog observed signals, or are complex signals or real signals. The method of the invention can be applied not only for the above examples, but also for derivative forms of these examples. Furthermore, in the above fields, the signal separation technique of the invention can be supplied by a computer that includes various memories and controllers and a display device, and also by a special apparatus or terminal.

Next, a signal separation method according to the present invention will be described in detail. First, by introducing a nonlinear function that can approximate a fourth-order cumulant into a cost function and making its minimization have a meaning equivalent to minimization of mutual information, a scheme to estimate a separation matrix represented as follows is considered.

Separation Matrix $\hat{\underline{W}}$                   [Equation 7]

Conventionally, a cost function used in such a scheme is the following format.

$$E\{\|\underline{x} - \hat{\underline{W}}\underline{f}(\hat{\underline{W}}^H\underline{x})\|^2\}$$ [Equation 8]

where $\underline{f}(\cdot)$ is a vector that has a nonlinear function such as tanh(·) as an element.

According to the present invention, a signal separation method is proposed that minimizes the following type of cost function in terms of the above separation matrix. That is, $$J_1(\hat{\underline{W}}) = \gamma^2 \ln E\{\exp(\gamma^{-2}\|\underline{x} - \hat{\underline{W}}\underline{f}(\hat{\underline{W}}^H\underline{x})\|^2)\}$$ [Equation 9]

Then, assuming that a difference between an initial true value of the separation matrix and an estimated initial value, and a noise generated in the estimation process are zero mean and decorrelated, and an estimated noise is a white random variable having unit variance. A white random variable means that $v_i$ and $V_j$ for any i and j (i≠j) are an independent stochastic variable in a variable series $[v_k]$. In the description below, an index (t) may be added instead of a hat symbol that indicates an estimate of the separation matrix, as long as there is no need to distinguish between a true value and an estimated value.

Minimization of the above cost function means minimization of the following equation in view of that a logarithmic function ln(·) is a monotonously increasing function.

$$E\{\exp(\gamma^{-2}\|\underline{x} - \hat{\underline{W}}\underline{f}(\hat{\underline{W}}^H\underline{x})\|^2)\}$$ [Equation 10]

In addition, though various proposals have been provided as to what kind of nonlinear function should be used, it is common to use threshold processing for changing a function to be used depending on whether the kurtosis of the observed signals is positive or negative, thereby selecting a function that enables an appropriate approximation of high order cumulants. Other various types of forms are also conceivable. Functions to be used include tanh(u), $u^3$, or u−tanh(u), etc. For example, u−tanh(u) is used when the kurtosis is positive, while tanh(u) is used when the kurtosis is negative.

Figure 2:
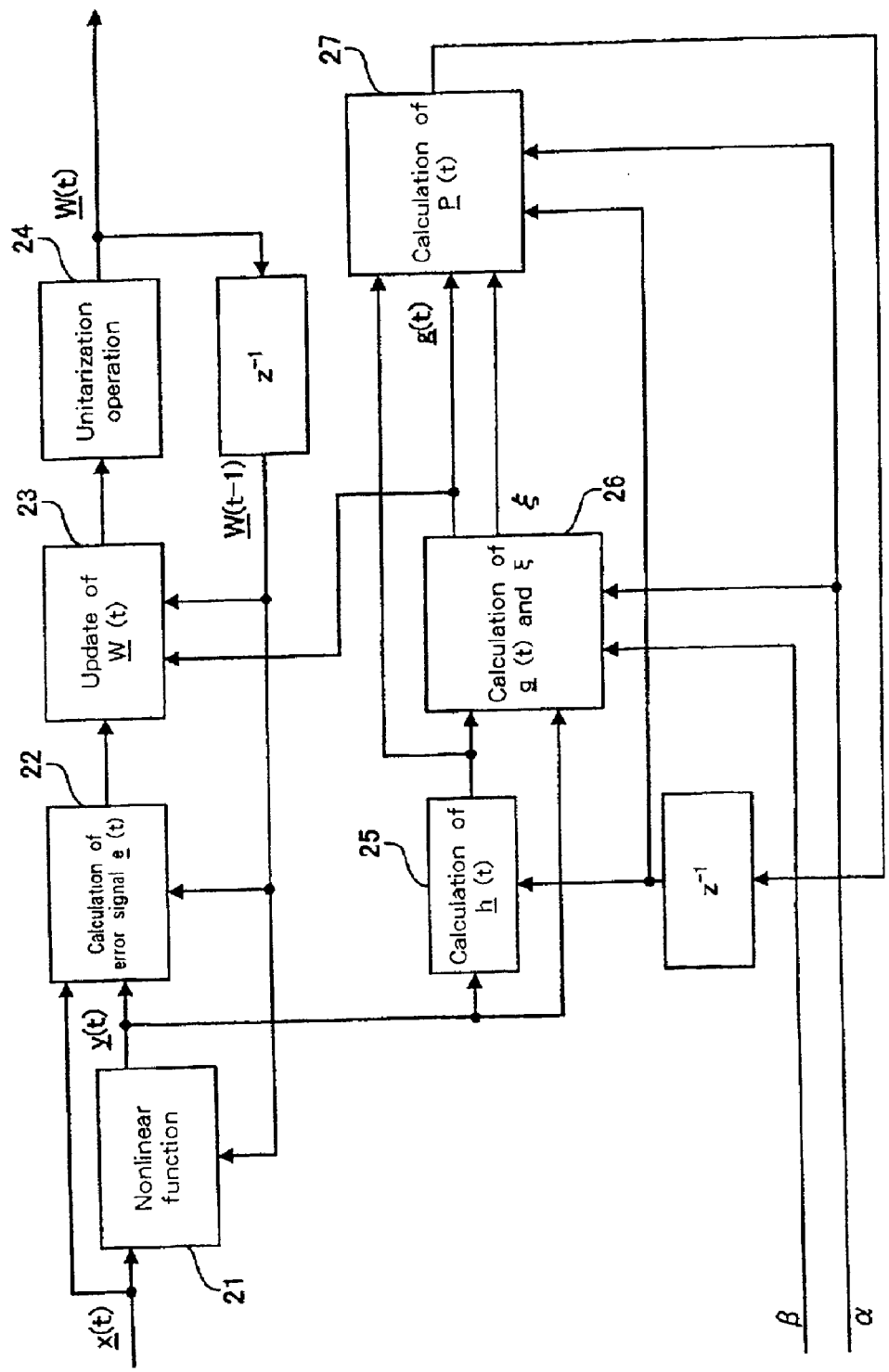
FIG. 2 shows an example of a block diagram showing a first algorithm for estimating a separation matrix that minimizes a cost function.

FIG. 2 depicts a block diagram showing a first algorithm for estimating a separation matrix that minimizes a cost function. The algorithm shown in FIG. 2 is represented as follows.

$$\underline{y}(t) = \underline{f}(\underline{W}^H(t-1)\underline{x}(t))$$ [Equation 11]

$$\underline{h}(t) = \underline{P}(t-1)\underline{y}(t)$$

$$\underline{g}(t) = \underline{h}(t)/[\beta + \underline{y}^H(t)\underline{h}(t)]$$

$$\alpha = 1 - \gamma^{-2}$$

$$\xi = \{\beta + \underline{y}^H(t)\underline{h}(t)\}/\{\beta + \alpha\underline{y}^H(t)\underline{h}(t)\}$$

$$\underline{P}(t) = \frac{1}{\beta}\{\underline{P}(t-1) - \alpha\xi\underline{g}(t)\underline{h}^H(t)\}$$

$$\underline{e}(t) = \underline{x}(t) - \underline{W}(t-1)\underline{y}(t)$$

$$\underline{W}(t) = \underline{W}(t-1) + \underline{e}(t)\underline{g}^H(t)$$

FIG. 2 depicts a flow of main algorithm by a nonlinear function 21, calculation of an error signal $\underline{e}(t)$ 22, update of $\underline{W}(t)$ 23, and a unitarization operation 24, wherein various amounts necessary for this main algorithm are calculated by each unit including calculation of $\underline{h}(t)$ 25, calculation of $\underline{g}(t)$ and $\xi$ 26, and calculation of $\underline{P}(t)$ 27. $z^{-1}$ is a delay for timing adjustment. As shown in FIG. 2 and the above algorithm, first an observed signal $\underline{x}(t)$ is input, and then $\underline{y}(t)$ is calculated by the nonlinear function 21 that is determined depending on whether the kurtosis is positive or negative. This nonlinear function 21 is constituted such that the nonlinear function 21 is operated on a product of an estimated separation matrix $\underline{W}(t-1)$ that was estimated at a previous time (i.e., previous cycle) and an observed signal $\underline{x}(t)$ at a present time. Thereafter, $\underline{y}(t)$ is input to the calculation of an error signal $\underline{e}(t)$ 22, where a difference is calculated between the observed signal $\underline{x}(t)$ at that time and a product of the estimated separation matrix $\underline{W}(t-1)$ at a previous time (i.e., previous cycle) and the calculated $\underline{y}(t)$. Next, the update of the separation matrix $\underline{W}(t)$ at that time is performed in a block 23. In this update of $\underline{W}(t)$ 23, $\underline{W}(t)$ is updated by multiplying $\underline{W}(t-1)$ estimated at the previous time by the error signal $\underline{e}(t)$ and $\underline{g}^H(t)$ The unitarization operation 24 is a step for assuring a unitary matrix after the update of $\underline{W}(t)$, where a given operation is advantageously performed for improving the accuracy. This is expressed as follows.

$$\underline{W}(t)=\underline{W}(t)\{(\underline{W}(t)^H\underline{W}(t))^{-1}\}^{1/2}$$ [Equation 12]

In the calculation of $\underline{h}(t)$ 25, $\underline{h}(t)$ is calculated from $\underline{P}(t-1)$ at the previous time and $\underline{y}(t)$. In the calculation of $\underline{g}(t)$ and $\xi$ 26, each value is calculated using a forgetting factor $\beta$. This forgetting factor $\beta$ is a constant of $0<\beta\leq 1$, which may be usually 1, however, when a matrix $\underline{W}$ to be estimated varies with time, this forgetting factor $\beta$ is set to smaller than 1 such as 0.99 or 0.98 to enable tracking for this varying. In the calculation of $\underline{P}(t)$ 27, $\underline{P}(t)$ is calculated, which is an inverse matrix of a covariance matrix of $\underline{y}(t)$, from $\underline{h}(t)$ calculated in the calculation of $\underline{h}(t)$ 25, input a, the forgetting factor $\beta$, and $\underline{g}(t)$ and $\xi$ calculated in the calculation of $\underline{g}(t)$ and $\xi$ 26. Note that initial values $\underline{P}(0)$ and $\underline{W}(0)$ are arbitrarily selected for these algorithms.

Now assuming that an observed signal $\underline{x}(t)$ undergoes preprocessing for transforming into a signal having a zero mean and performing whitening, before the above estimation processing of a separation matrix. This preprocessing is performed on the observed signal $\underline{x}(t)$ and needs no information of the original signal. Whitening means that each element of the observed signal vector is made uncorrelated to make the variance 1, a technique of which may not be specified and possible using eigenvalue decomposition or principal component analysis, for example.

Figure 3:
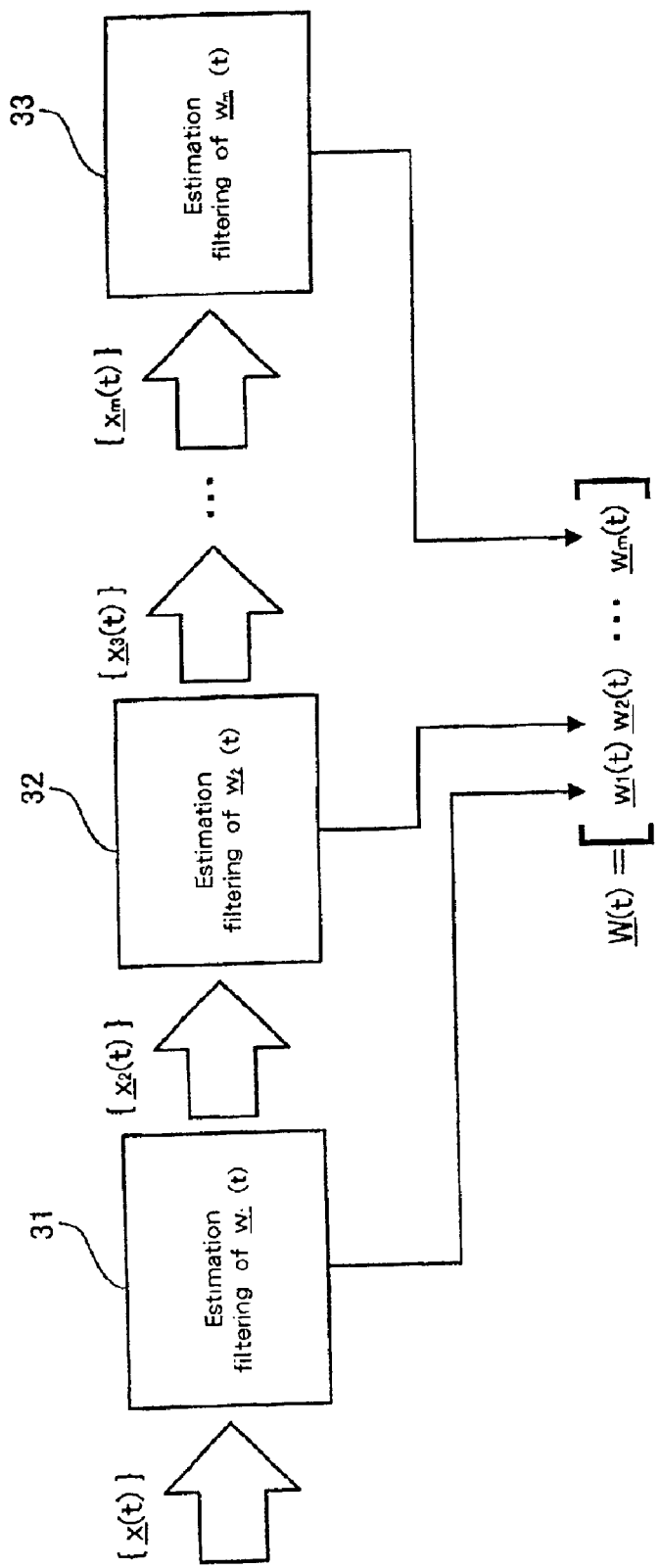
FIG. 3 shows an example of an overall configuration of a second algorithm.
Figure 4:
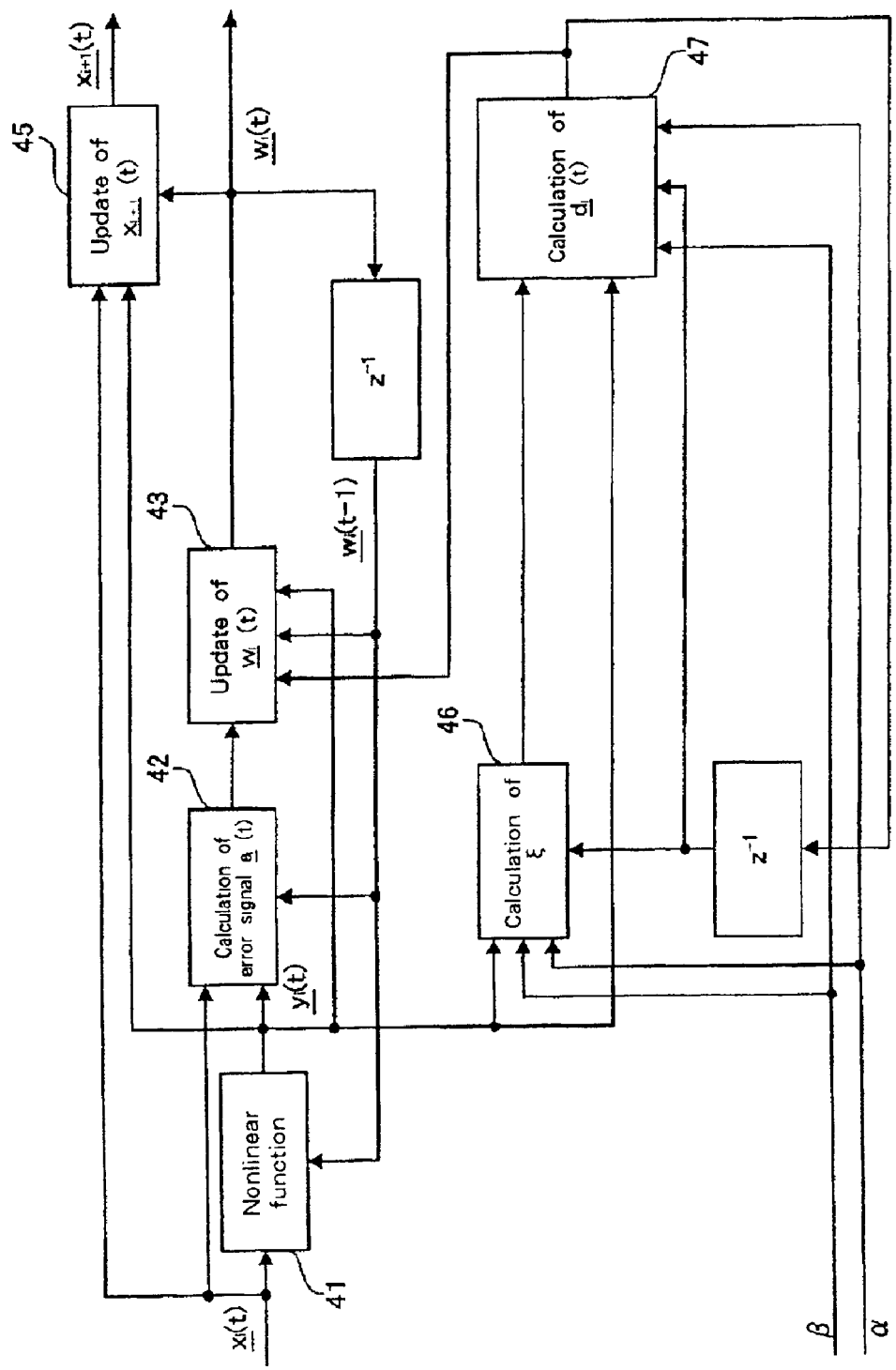
FIG. 4 shows an example of an estimation filtering of $\underline{W_i}(t)$ in a second algorithm.

In this way, the signal separation method according to the present invention is based on optimizing a cost function $J_1$ based on an exponential function in terms of a separation matrix. Therefore, from this point of view, a similar result would be obtained by using other algorithms. FIG. 3 and FIG. 4 depict a configuration of the second algorithm. FIG. 3 depicts an overall configuration of a second algorithm, while FIG. 4 depicts an estimation filtering of $W_j(t)$. This is what the first algorithm is transformed by deflation. In this second algorithm, optimization is performed by estimating a column vector one by one to reduce the order in turn, as shown in FIG. 3. For example, estimation filtering of $W_1(t)$ is performed on the observed signal $\underline{x}_1(t)$ in block 31, then estimation filtering of $\underline{W}_2(t)$ is performed on the observed signal $\underline{x}_2(t)$ in block 32, and in the same manner, estimation filtering of $\underline{W}_m(t)$ is performed on the observed signal $\underline{x}_m(t)$ in block 33, thereby finally deriving the estimated separation matrix $\underline{W}(t)$.

That is, in this second algorithm, an operation shown in FIG. 4 is repeated for each $x_i(t)=\underline{x}(t)$, i=1, ..., m.

The algorithm shown in FIG. 4 is represented as follows.

$y_i(t) = f(\underline{W}_i^H(t-1)\underline{x}_i(t))$ $\alpha = 1-\gamma^{-2}$ $\underline{e}_i(t) = \underline{x}_i(t) - \underline{W}_i(t-1)y_i(t)$ $\xi = \dfrac{\beta d_i(t-1) + y_i(t)^* y_i(t)}{\beta d_i(t-1) + \alpha y_i(t)^* y_i(t)}$ $\dfrac{1}{d_i(t)} = \dfrac{1}{\beta}\left\{\dfrac{1}{d_i(t-1)} - \alpha\xi y_i(t)^* \dfrac{y_i(t)}{d_i(t-1)\{\beta d_i(t-1) + y_i(t)^* y_i(t)\}}\right\}$ $\underline{W}_i(t) = \underline{W}_i(t-1) + \underline{e}_i(t)[y_i(t)^*/\{\beta d_i(t-1) + y_i(t)y_i(t)^*\}]$ $\underline{x}_{i+1}(t) = \underline{x}_i(t) - \underline{W}_i(t)y_i(t)$  [Equation 13]

where $d_i(0)$ is any initial value, a subscript * represents conjugate. $f(\cdot)$ represents a nonlinear function such as $\tanh(\cdot)$ In FIG. 4, a flow of main algorithm is represented by a nonlinear function 41, calculation of an error signal $\underline{e}_i(t)$ 42, update of $\underline{W}_i(t)$ 43, and update of $\underline{W}_{i+1}(t)$ 45, wherein various amounts necessary for this main algorithm are calculated by each unit including calculation of $\xi$ 46 and calculation of $d_i(t)$ 47. $z^{-1}$ is a delay for timing adjustment. The accuracy is enhanced by performing a unitarization operation when each $\underline{W}_i(t)$ is found or when all $\underline{W}_i(t)$ are found. For example, in the case of a real vector, Gram-Schmidt orthogonalization process may be applied, however, there is no need to restrict a method.

Figure 5:
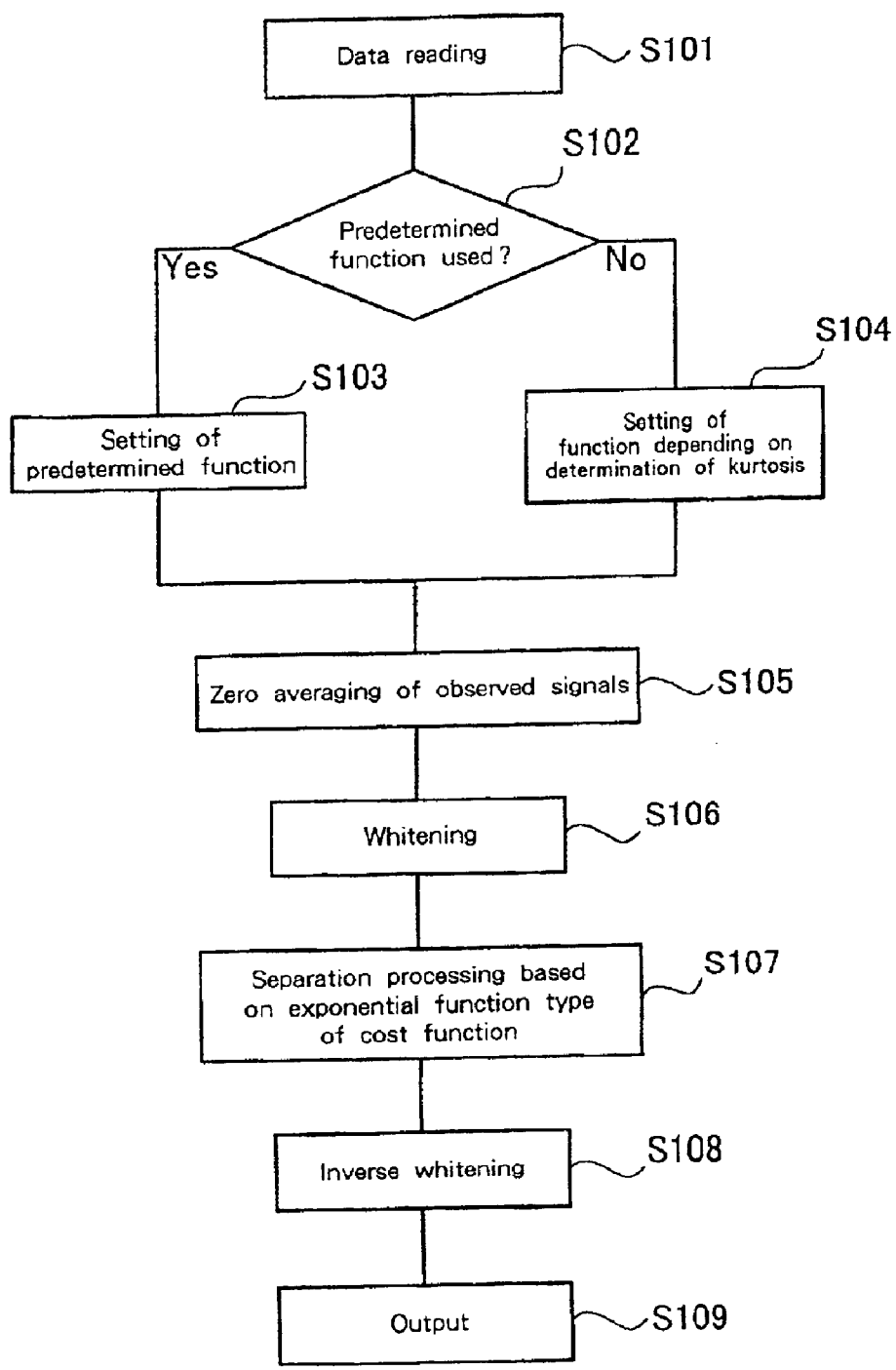
FIG. 5 shows an example of a flow of processing from data reading to data outputting according to the present invention.

FIG. 5 is a flowchart showing the processing from the reading of data to the output of data in this embodiment. First, data for an observed signal $\underline{x}(t)$ is read (step 101), and selection is performed, dependent on whether an established non-linear function should be employed for an algorithm or a function should be changed in accordance with the kurtosis (steps 102 to 104). That is, it is determined whether a predetermined function is used or not (step 102), if so, the predetermined function is set (step 103), otherwise the function is set depending on the determination of kurtosis (step 104). Next, zero averaging of the observed signal $\underline{x}(t)$ is performed, that is, an average of the observed signal $\underline{x}(t)$ is subtracted to make the average be zero (step 105), then whitening of the observed data is performed (step 106). Next, from the beginning of data to the end, or from the beginning to a predetermined data point, separation processing is recursively performed, which is based on an exponential function type of cost function according to the present invention (step 107), then the inverse whitening is performed as a post-processing (step 108), and finally the output result is obtained (step 109).

As the separation processing, the configuration based on the first algorithm shown in FIG. 2 or the configuration based on the second algorithm shown in FIG. 3 and FIG. 4 may be used.

Next, characteristic of a signal separation method according to the present invention will be described. As previously stated, a cost function that has been used before is the one that has the following form based on $H^2$ norm.

$$J_2(\underline{\hat{W}}) = E\{\|x - \underline{\hat{W}}f(\underline{\hat{W}}^H x)\|^2\} \quad \text{[Equation 14]}$$

Such type of cost function estimates a separation matrix with equal consideration weight even when some kind of perturbation such as an estimation error is added to the estimated vector (represented by the following equation) or when the convergence is obtained.

$$\hat{x} = \underline{\hat{W}}f(\underline{\hat{W}}^H x) \quad \text{[Equation 15]}$$

On the other hand, according to an exponential function type of cost function of the present invention, as the error increases, the consideration weight involved in cost function increases, so that the convergence is accelerated, while when close to convergence, a stable estimation is expected so as not to accelerate the unnecessary update.

Figure 6:
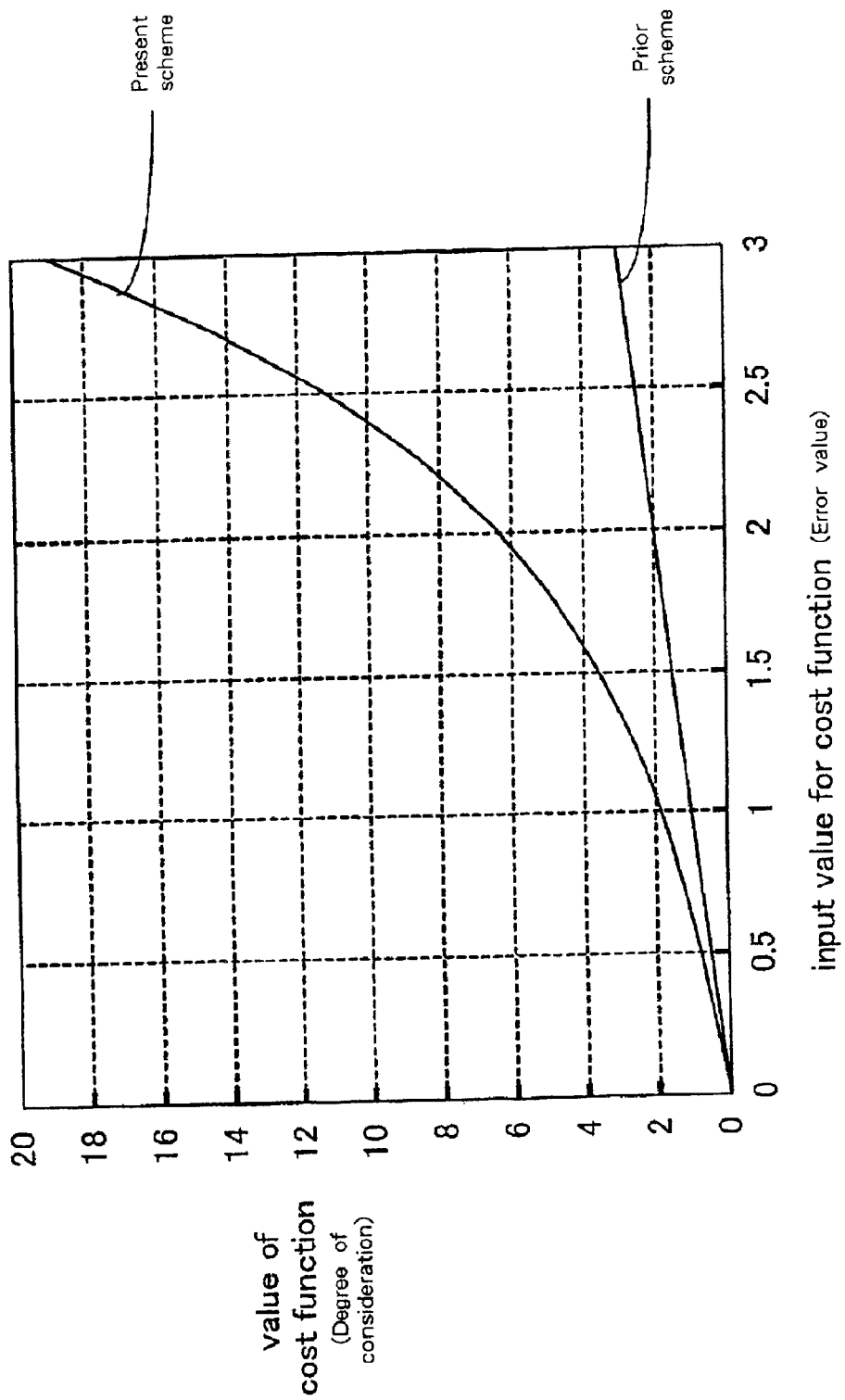
FIG. 6 shows an example of a conceptual diagram showing a degree of consideration of an error in the cost function.

FIG. 6 depicts a conceptual diagram showing a degree of consideration of an error in the cost function. The horizontal axis shows the value of the error, while the vertical axis shows a degree of consideration. An approximate straight line in the drawing indicates the prior scheme, while a curved line with a downward convex shape indicates the scheme of the present invention. According to the present invention, in the initial stage of estimation where an estimation error is large, a large update is performed with an optimal update amount, while in the stage where the estimation proceeds, an appropriate update for fine tuning is performed steadily, so that consequently the estimated result with high-precision is obtained by a small number of steps.

An example of the extension of a difference from the conventional case is an example wherein a large area can not be obtained to install a signal observation apparatus, such as a portable information device. At this time, components of each row or column of a mixing matrix $\underline{A}$ have the same value, wherein the condition number of the mixing matrix $\underline{A}$ becomes large. As the condition number becomes large, the perturbation of the estimation error or the like has a great influence, thus the prior scheme is likely to need extra steps for convergence even when a small perturbation occurs.

On the other hand, according to the present scheme, as the consideration weight in the cost function becomes large when the large perturbation occurs, an effect equivalent to making a correction large is possible in the update equation in the algorithm. As a result, according to the present scheme, it is expected to accelerate the convergence. Of course, according to the present invention, as is evident from the above consideration that the convergence is accelerated compared with the prior scheme when the condition number is not large, so that the separation matrix with high-precision is expected to be estimated more quickly. That is, according to the present scheme, an update amount that tries to suppress an estimation error as much as possible is improved under a more appropriate cost function than the prior one.

Further, as is apparent from the described algorithm, the present scheme is considered to have a structure of adaptive filtering, so that even when a mixing matrix $\underline{A}$ is time-varying, e.g., the mixing state is changed during the observation, signal separation with tracking the time-variation can be performed.

According to the above explanation, provided that an exponential function type of cost function is used and its calculation method is to optimize the cost function $J_1$, the present invention is not limited to the above-mentioned form. A similar algorithm may be derived from a cost function that is based on an approximate expression where an exponential function is expressed in a polynomial expansion, or a cost function that is based on a function having a similar monotonously increasing characteristic. Now, a cost function will be described, which has the same meaning as an exponential function type of cost function. That is, by deriving an estimation algorithm of a separation matrix based on two cost functions described below, an algorithm similar to the ones shown in FIG. 2, FIG. 3 and FIG. 4 can be derived.

[Equation 16]

$$J_{11}(\hat{\underline{W}}) = \sup_{\underline{W}_0} \frac{E\{\|\underline{W}f(\underline{W}^H x) - \hat{\underline{W}}f(\hat{\underline{W}}^H x)\|^2\}}{(\underline{W}_0 - \hat{\underline{W}}_0)^H \prod_0^{-1} (\underline{W}_0 - \hat{\underline{W}}_0) + E\{\|\underline{x} - \underline{W}f(\underline{W}^H x)\|^2\}} < \gamma^2$$

$$J_{12}(\hat{\underline{W}}) = \min_{\hat{\underline{W}}} \max_{\underline{W}_0} [E\{\|\underline{W}f(\underline{W}^H x) - \hat{\underline{W}}f(\hat{\underline{W}}^H x)\|^2\} - \gamma^2 \{(\underline{W}_0 - \hat{\underline{W}}_0)^H \prod_0^{-1} (\underline{W}_0 - \hat{\underline{W}}_0) + E\{\|\underline{x} - \underline{W}f(\underline{W}^H x)\|^2\}\}]$$

where $\underline{\Pi}_0$ is a positive-definite matrix representing a degree of uncertainty for an initial value $\underline{W}_0$, $\underline{W}$ is a true value of a separation matrix. Note that a positive-definite matrix means a matrix $\underline{M}$ where $\underline{V}^H \underline{M} \underline{V}$ becomes positive for all non-zero vectors $\underline{V}$.

$J_{11}$ is an H-infinity norm and the format of this cost function means that no matter how large an estimation error exists, a method can be derived which estimates a separation matrix, wherein the upper bound of $H^2$ norm of estimation errors is less than or equal to a predetermined scalar quantity. A cost function $J_{12}$ means that a method for optimization can be derived in a strategy using the MinMax theorem of the game theory, wherein a separation matrix that generates a minimum error is selected as a solution, from among the candidates of a maximal value of errors that arise for various separation matrices. What these cost functions mean is consistent with the features of the signal separation method derived from the exponential function type of cost functions described above.

Next, the results of the experiment will be described when applying a signal separation method according to the present invention, wherein three kinds of synthetic signals were prepared to conduct an experiment of their separation. These synthetic signals are as follows.

$r_1 = \sin(2\pi 60 t)$ $r_2 = \text{sign}(\sin 2\pi 500 t))$ $r_3$ : random variables uniformly distributed between [0, 1]        [Equation 17]

where the sampling frequency was 10 kHz, sign(·) represents a function that outputs a sign of (·).

The methods of the aforementioned Reference 3 and Reference 4 were used as comparative objects. The method of Reference 3 is the one that is based on a relative gradient of which convergence is said to be fast among gradient methods, while the method of Reference 4 is a conventional least squares type of algorithm. As a comparative object, the algorithm of the present invention shown in FIG. 2 is employed. It was assumed that a mixing matrix is generated from random variables that are uniformly distributed between [0, 1] and that the condition numbers are over 2000.

Figure 7:
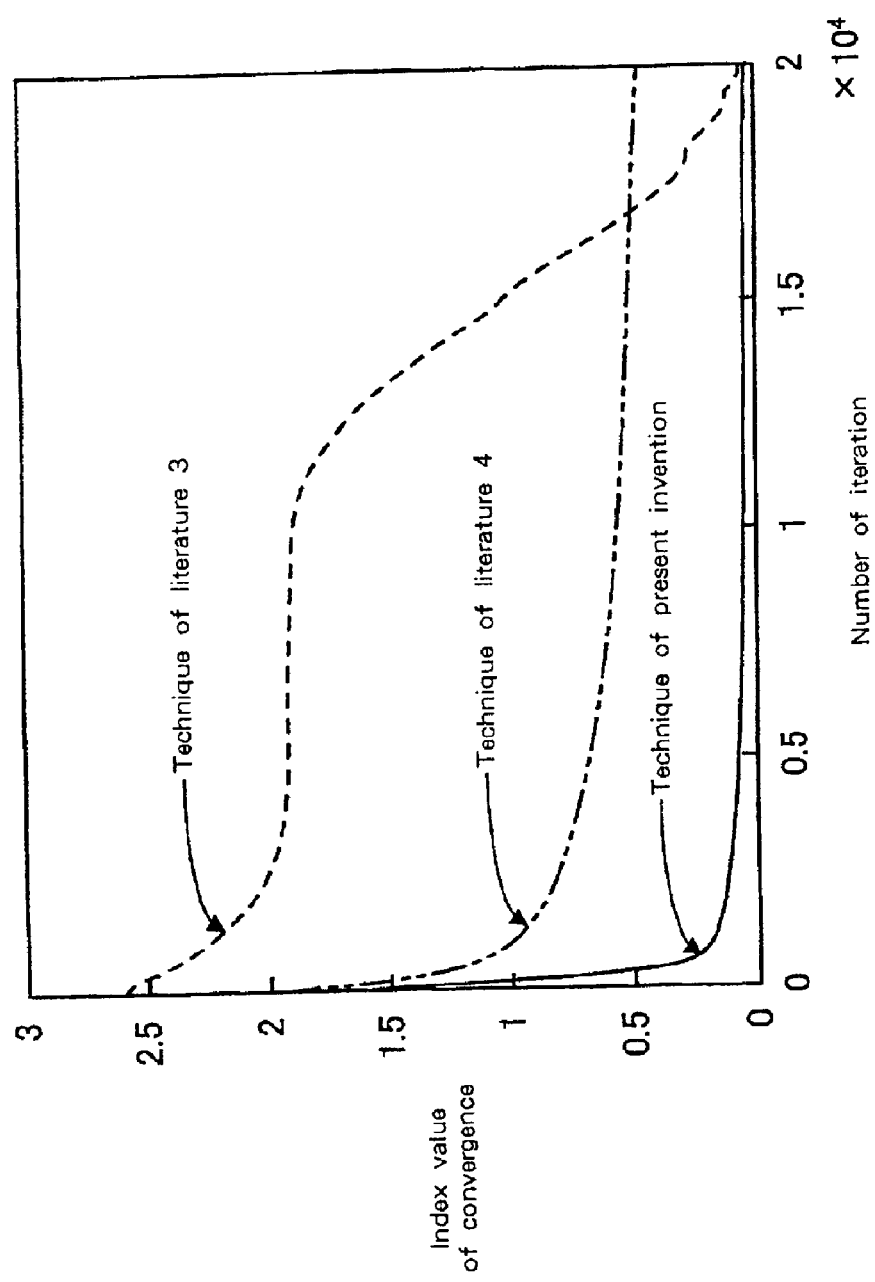
FIG. 7 depicts the results of convergence when conducting the independent trial ten times and taking an average of them in the experiment of separation.

FIG. 7 depicts the results of convergence when conducting the independent trial ten times and taking an average of them in the experiment of separation. The horizontal axis represents the number of iterations, while the vertical axis represents an index value of convergence, wherein the characteristics of convergence by using synthetic signals are shown corresponding to when using a technique of Reference 3, a technique of Reference 4, and a technique of the present invention. As the characteristic index of convergence at this time, the following index used in the Reference 4 is employed, which indicates that the precision of estimation becomes higher when approaching zero.

[Equation 18]

$$C = \sqrt{\sum_i \left( \sum_j \frac{|p_{ij}|^2}{\max_k |p_{ik}|^2} - 1 \right) + \sum_j \left( \sum_i \frac{|p_{ij}|^2}{\max_k |p_{kj}|^2} - 1 \right)}$$

where $P_{ij}$ represents (i, j) element of a matrix that is obtained as a product of an estimated separation matrix and a mixing matrix $\underline{A}$. As the technique of Reference 3 requires that a user determines the update step-size, here a step-size that achieves the fastest convergence is used among the ones that achieve the convergence at the same level of stability as the present invention. However, as is evident from FIG. 7, the convergence speed of the technique of Reference 3 is slower than the technique of the present invention. On the other hand, although a step-size can be automatically set to an optimal one according to the technique of Reference 4 and the technique of the present invention, it is evident that the technique of the present invention achieves a faster convergence than the technique of Reference 4.

As the result of examination of the number of FLOPS (Floating Operations Per Second), i.e., the number of floating operations that can be processed per second for respective techniques in the above experiment, it proved that the number of FLOPS for one step is nearly the same for the present invention and the Reference 4. Therefore, it is understood that the total number of FLOPS to convergence is smaller for the technique of the present invention. On the other hand, comparing the Reference 3 and the present invention, the number of FLOPS required for one step is smaller for the technique of Reference 3, however, the simulation proved that the total number of FLOPS used for satisfying convergence is reduced to less than ⅔ by the present invention. When using the algorithms shown in FIG. 3 and FIG. 4, nearly equal results can be obtained. Moreover, when not making the condition number of mixing matrix A̲ an unfavorable condition like this simulation, a similar result can be obtained.

Figure 8:
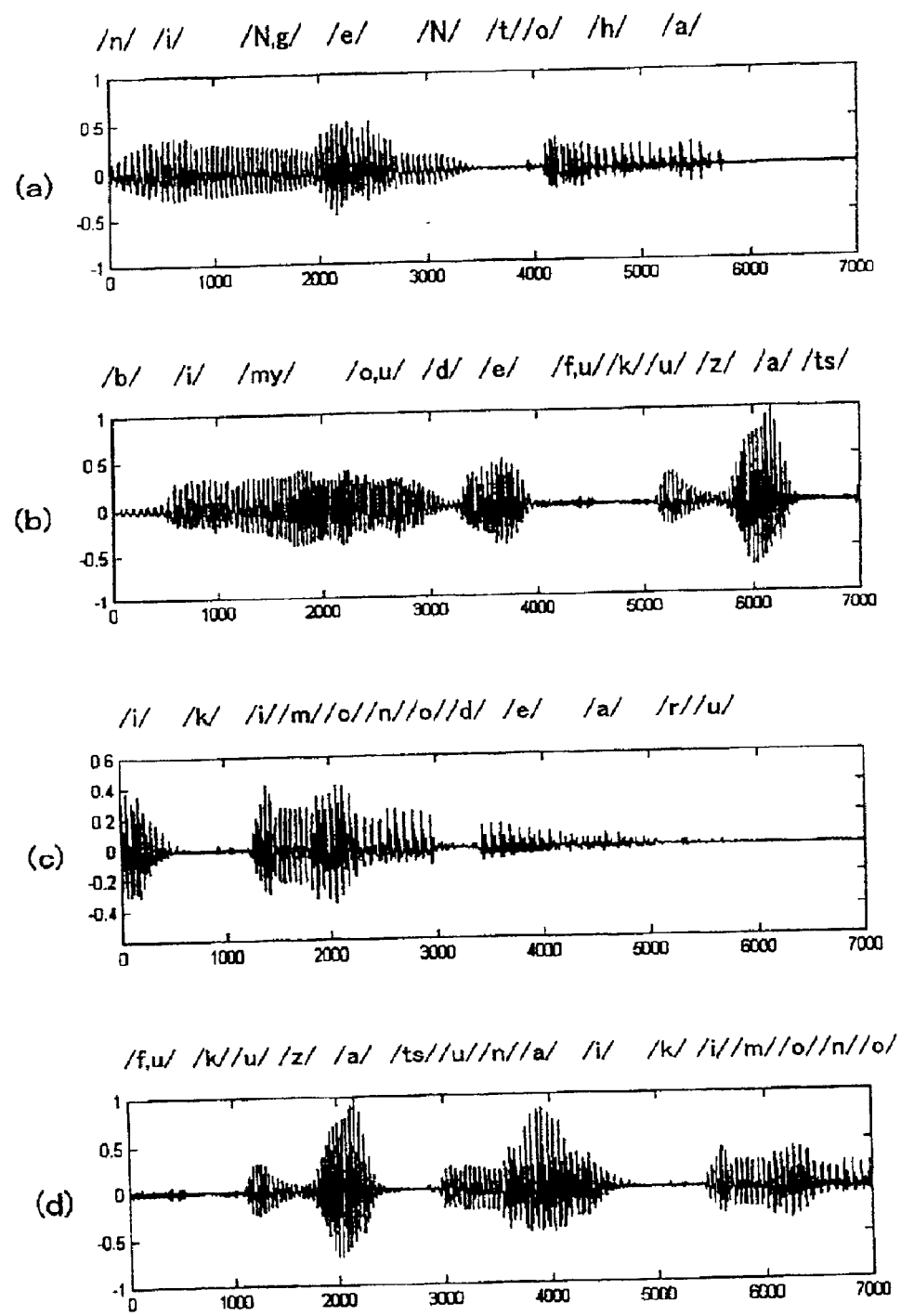
FIGS. 8A to 8D are diagrams showing the original signals of real speech.
Figure 9:
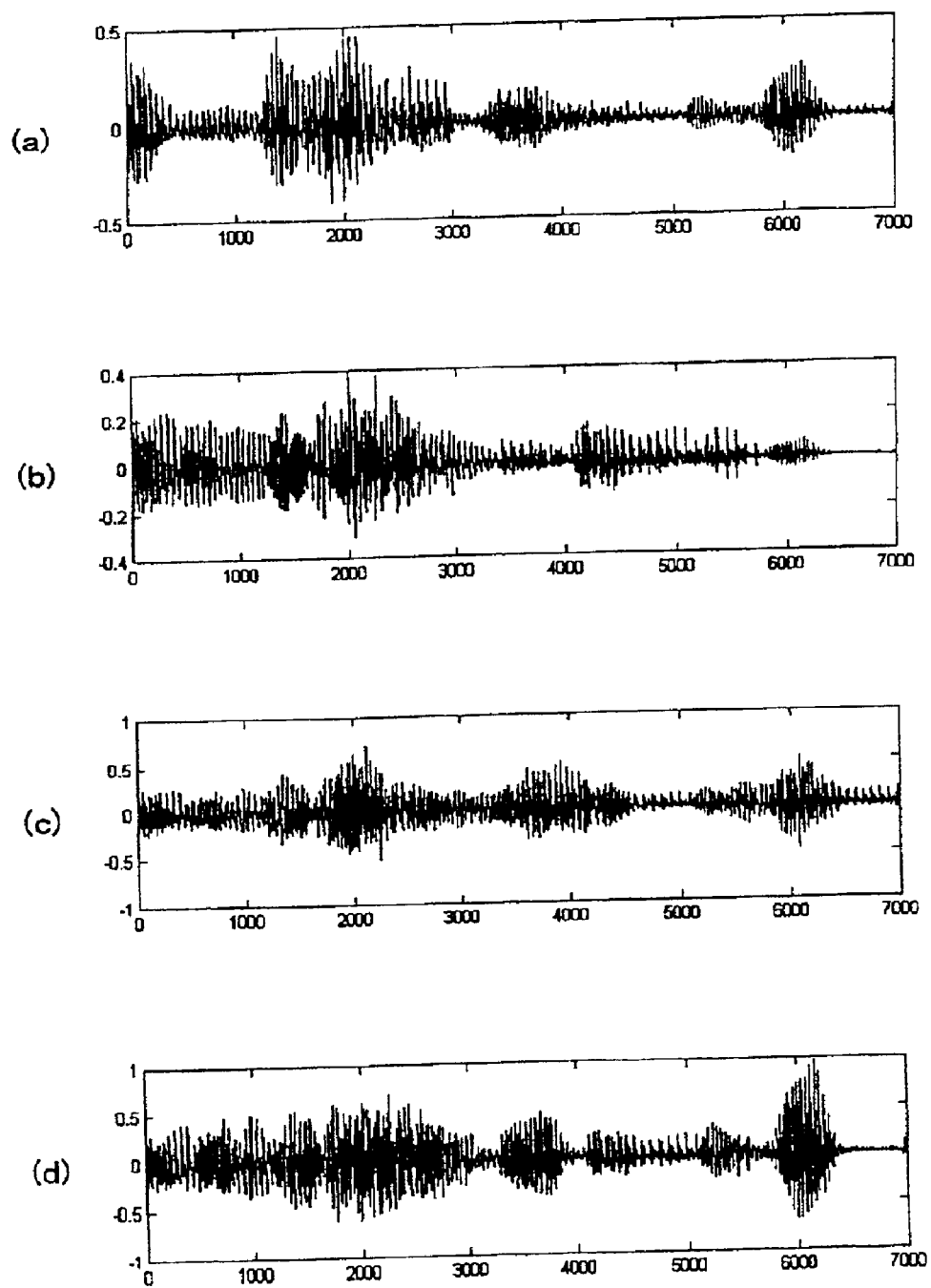
FIGS. 9A to 9D are diagrams showing mixed speech signals.
Figure 10:
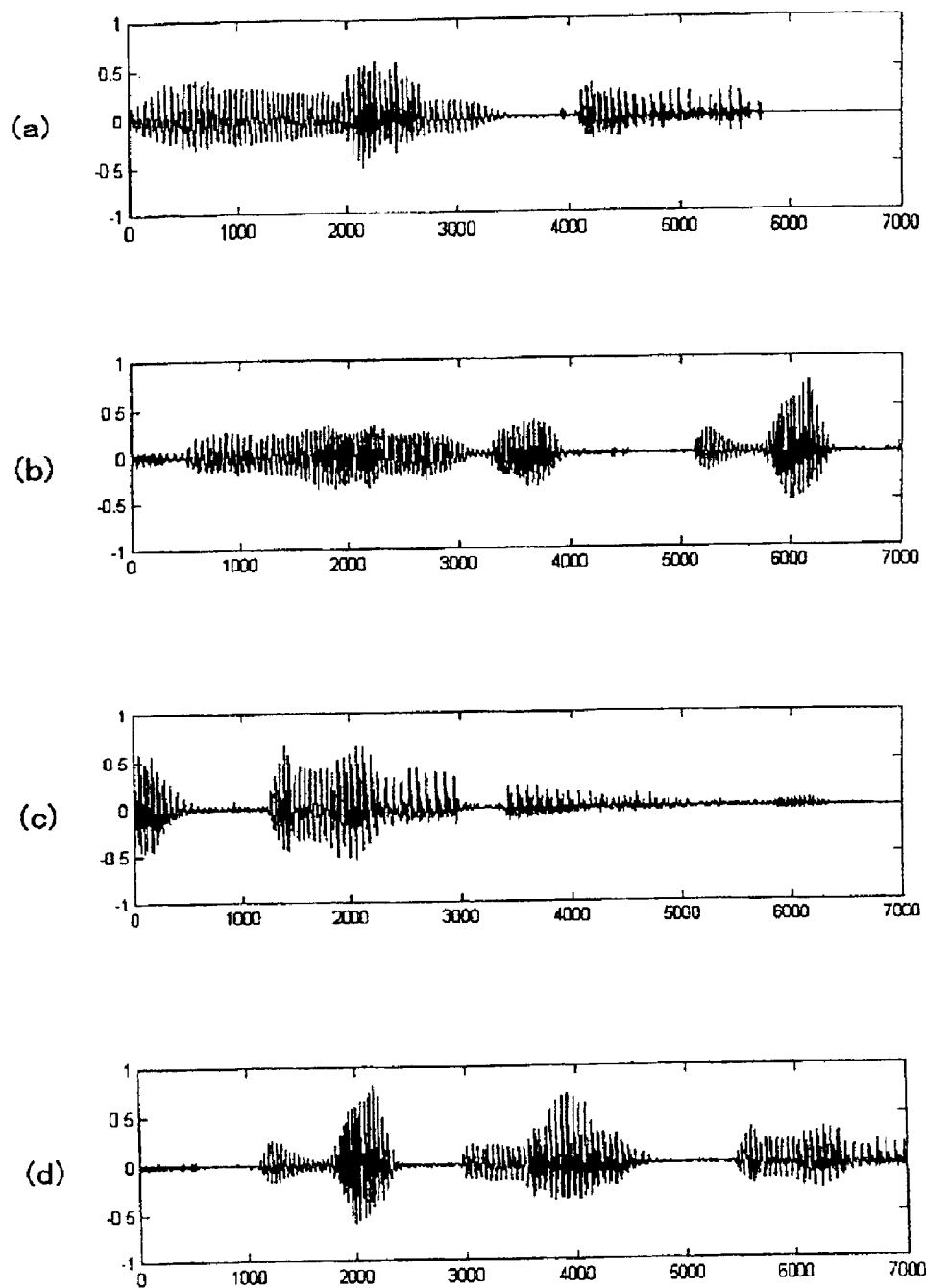
FIGS. 10A to 10D are diagrams showing the separation results obtained by this embodiment.

FIGS. 8 to 10 are diagrams for explaining speech signal separation results as an example for implementing real signal separation. FIGS. 8A to 8D are diagrams showing the original signals of real speech. FIGS. 9A to 9D are diagrams showing mixed speech signals, which are obtained by mixing the signals in FIGS. 8A to 8D using a mixing matrix generated by employing uniformly distributed random variables. FIGS. 10A to 10D are diagrams showing the separation results obtained in this embodiment. The horizontal axis in each graph represents a sample number, and the vertical axis represents an amplitude. In FIG. 8A, the real speech for /n/, /i/, /N,g/, /e/, /N/, /t/, /o/, /h/, /a/ (ningen-towa; "a human being is" in Japanese) is shown. In FIG. 10A, the separation results of mixed speech signals are shown, and it is apparent that the same signals as in FIG. 8A are obtained and that the original signal was stably separated from multiple signals by the method of the invention.

In FIG. 8B, the real speech of /b/, /i/, /my/, /o,u/, /d/, /e/, /f,u/, /k/, /u/, /z/, /a/, /ts/ (bimyo-de fukuzatsu; "delicate and complicated" in Japanese) is shown. In FIG. 10B, the separation results provided by the mixed speech signals, and the real speech in FIG. 8B are separated. Furthermore, in FIG. 8C, the real speech for /i/, /k/, /i/, /m/, /o/, /n/, /o/, /d/, /e/, /a/, /r/, /u/ (ikimono-de aru; "a living thing" in Japanese) is shown. In FIG. 8D, the real speech for /f,u/, /k/, /u/, /z/, /a/, /ts/, /u/, /n/, /a/, /i/, /k/, /i/, /m/, /o/, /n/, /o/ (fukuzatsu-na ikimono; "a complicated living thing" in Japanese) is shown.

In FIGS. 10C and 10D, the speech signals separated for this embodiment are shown, and it is apparent that the same amplitudes shown in FIGS. 8C and 8D are obtained. As is described above, when multiple speech signals (other speech signals) mix with a target real speech signal, the method of the invention can be used to stably separate the target real speech signal.

An explanation will now be given for examples (1) to (3) illustrating the application of the signal separation method of this invention to other fields.

(1) Reduction of the Artifact from an Observed Bio-signal Provided by Magnetoencephalography (MEG) or Electroencephalography (EEG)

The signal separation method of the invention is one type of independent component analysis, and can be expected to be used as a method for separating a brain active potential signal from artifacts in a MEG or EEG record. The artifacts consist of active potential of heart, blinking, the movements of eyeballs or changes in the myoelectric potential, an electrical/magnetic disturbance due to environment, and the malfunction of a sensor. These should be separated from a signal waveform that represents the brain activity. However, when multi-channel electrodes are attached to the surface of a head for the observation of bio-signals, signals representing brain activity and the above artifacts are observed at the same time. Conventionally, artifacts are reduced to a degree as the result of a time and frequency assumption; however, brain wave signals also tend to be removed. In this embodiment, even when the mixing process is unknown, only a comparatively short observation time is used to separate and extract an original signal, and a more accurate extraction of brain active potential signals can be expected.

(2) Reduction of the Interference Produced by a Down-link Signal, Which Serves a as Link from a Base Station to an Individual Mobile Terminal, at the Time of a Code Division Multiple Access (CDMA)

The CDMA is a multiple access technique based on spread spectrum. In this embodiment, a user spreads an information spectrum by using spread codes, and multiple users communicate with each other over the same frequency band. Thus, the spread information for one different user is interference noise for other users. In addition, communication is also affected by fading due to multi-paths.

The detection and the estimation of delays in transmission code are important in order to reduce the influence of deteriorating factors, and the conventional reception technique includes the detection of time delays using a matched filter or a maximum likelihood method. The conventional method for providing an efficient operation can satisfactorily cope with a location, such as a base station, that is equipped with a satisfactory signal processing facility. However, it is anticipated that it will be more difficult when a complicated signal processing apparatus, which increases the accuracy of the conventional system, is attached to a mobile terminal for which a reduction in size and in the power consumed is desired. Thus, when the method of this embodiment is employed, whereby an affect produced by fading or a signal from another user having an unknown spread code is modeled as the coefficient for a mixing matrix, and whereby only a signal from a local user is separated from the received signal, the signal can be received more accurately than by the conventional method.

The mobile terminal device to which the embodiment is applied includes various functions, such as communication means, control means and display means, that are employed for a common portable telephone or PDA (Personal Digital Assistants) known to those skilled in the art. Thus, a detailed explanation for this need not be given.

(3) Usage of a Data Analysis Method for Extracting an Important Fluctuation Element (Factor), such as a Stock Price Pluctuation, that can not be Detected from Economic Statistical Data, and for Portfolio Management in the Financial Field The prediction of profits for all franchised stores is employed as example management data. It can be assumed that sales data for each store for each day is produced by a trend that affects overall sales for all franchised stores and sales factors that influence sales at each store. Example factors that influence sales at each store can be a change in the willingness of local consumers to purchase goods that is due to advertisements disseminated by mass media, and advertisements prepared by and sales methods employed in each store. However, when analyzing management data, it is important that main factors, independent of the various factors referred to, be extracted that affect the overall cash flow for all franchised stores. Therefore, when we assume that the sales data for all franchised stores consist of an overall trend and the individual factors mixed by an unknown mixing matrix, the signal separation method of this embodiment, i.e., one type of independent component analysis method, can be effectively employed, so that the management analysis can be performed more quickly and accurately than by the conventional method.

The usage for the financial field can be considered in the same manner. For various portfolio products developed through financial engineering, portfolio return prediction can be performed for a set of several certificate issues, and a determination can be made as to how investment division should be handled. At this time, when the main element has been observed and designated that drives the setting of stock prices, an effective financial engineering product can be provided. Assuming that each stock price change can be modeled by the sum of several independent components, the independent component that drives the target setting can be obtained by employing the signal separation method of this embodiment. Then, when the trend of the independent component that largely affects the stock price is read and the estimated stock price is synthesized using the estimated mixing matrix, a more effective portfolio return can be predicted. Further, when modeling is performed at a higher level, based on the above described idea, the accuracy of the independent component analysis method and the need for a fast convergence method are not lost. As is apparent from the fact that the independent component analysis can be correlated with the cost function, for which the high-order statistics is taken into account, it can be expected that the accuracy will be increased compared with using a combination of the principle components that are extracted using a method, such as a conventional principle component analysis method, for which the second-order statistics is taken into account. Further, in this embodiment, since only a short time is used to estimate a separation matrix, a separation matrix can be accurately estimated by using only a small amount of observed data, and a quick determination can be implemented. From this viewpoint, it is also apparent that the method of this embodiment can be effectively employed for the management/financial data analysis method in manners described and known to those skilled in the art.

As is described above, according to the invention, when multiple mixed signals are observed, only a small number of calculation steps are used to stably separate and extract the original signal from these multiple mixed signals.

The present invention can be realized in hardware, software, or a combination of hardware and software. It may be implemented as a method having steps to implement one or more functions of the invention, and/or it may be implemented as an apparatus having components and/or means to implement one or more steps of a method of the invention described above and/or known to those skilled in the art. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or after reproduction in a different material form.

Thus the invention includes an article of manufacture which comprises a computer usable medium having computer readable program code means embodied therein for causing one or more functions described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

Having thus described my invention, what I claim as new and desire to secure by Letters Patent is as follows:

1. A signal separation method comprising restoring an original signal from observed data, obtained by observing multiple mixed signals, including the steps of:

estimating, from said observed data, a separation matrix using an adaptive filter that suppresses the H-infinity norm concerning said separation matrix until the H-infinity norm is equal to or smaller than a provided scalar value; and restoring said original signal by multiplying said separation matrix by said observed data.

2. A signal separation method comprising the steps of:

selecting, for said observed data, a specific separation matrix from among multiple separation matrixes based on MinMax strategy in game theory; and restoring an original signal by multiplying said selected separation matrix by said observed data.

3. A signal separation method comprising: estimating and restoring an original signal from observed data obtained by observing multiple mixed signals, which include said original signal, including the steps of:

introducing, for said observed data, a cost function based on a function having a monotonously increasing characteristic;

estimating a separation matrix using an adaptive filter that optimizes said cost function; and estimating and restoring said original signal by multiplying said separation matrix by said observed data.

4. The signal separation method according to claim 3, wherein, the step of estimating a separation matrix includes employing an adaptive filter for minimizing said cost function for said separation matrix.

5. The signal separation method according to claim 3, wherein said cost function to be introduced is an exponential type function.

6. A signal separation method comprising: separating and extracting an original signal from observed data obtained by observing multiple mixed signals, which include said original signal, including the steps of:

reading observed signals;

subtracting the average of said observed signals and performing zero averaging for said observed signals;

whitening the observed signals obtained by zero averaging;

separating said whitened observed signals based on a cost function that has a monotonously increasing characteristic; and performing, as a post processing, inverse whitening for the obtained observed signals.

7. The signal separation method according to claim 6, further comprising changing a non-linear function to be used in said cost function employed for said separation based on the kurtosis of each of said observed signals.

8. A signal processing apparatus comprising:

input means, for receiving observed data obtained by observing multiple mixed signals, which include an original signal;

separation matrix estimation means, for estimating, for said observed data, a separation matrix using adaptive filtering for suppressing the H-infinity norm concerning said separation matrix until the H-infinity norm is to equal to or smaller than a provided scalar value; and estimation/restoration means, for estimating and restoring said original signal by multiplying said separation matrix by said observed data.

9. A signal processing apparatus comprising:

input means, for receiving observed data obtained by observing multiple mixed signals, which include an original signal;

selection means, for employing, for said observed data, the MinMax strategy in game theory to select, from separation matrixes, a specific separation matrix; and estimation/restoration means, for estimating and restoring an original signal by multiplying said separation matrix by said observed data.

10. A signal processing apparatus comprising:

input means, for receiving observed data obtained by observing multiple mixed signals;

separation matrix estimation means, for estimating, for said observed data received from said input means, a separation matrix by using an adaptive filter with optimizing a cost function that is based on a function having a monotonously increasing characteristic; and estimation/restoration means, for estimating and restoring an original signal by multiplying said separation matrix by said observed data.

11. The signal processing apparatus according to claim 10, wherein said adaptive filter used for said separation matrix estimation means includes a filter for minimizing said cost function for said separation matrix, and said function having said monotonously increasing characteristic is an exponential type function.

12. A signal processing apparatus comprising:

a non-linear function unit, for performing a non-linear function for an input observed signal and a separation matrix estimated during a previous cycle;

an error signal calculator, for calculating an error signal based on the value obtained by said non-linear function unit, said separation matrix estimated during the previous cycle, and said observed signal at a present time; and a separation matrix update unit, for updating said separation matrix estimated at said time based on said error signal, so that error evaluation is weighted by said cost function having the monotonously increasing characteristic, for outputting and/or separating an original signal from an input observed signal.

13. The signal processing apparatus according to claim 12, further comprising:

a unitarization operator for ensuring the transform to a unitary matrix of said separation matrix that has been estimated at said time and that has been updated by said separation matrix update unit.

14. A signal processing apparatus comprising:

input means, for receiving mixed speech data obtained by observing multiple mixed speech signals;

separation matrix estimation means, for estimating a separation matrix, for said mixed speech data, using an adaptive filter with optimizing a cost function that is based on a function having a monotonously increasing characteristic; and separation/extraction means, for separating and extracting said speech signals from said mixed speech data by multiplying said separation matrix by said mixed speech data.

15. A signal processing apparatus for separating an artifact from an observed bio-signal, said apparatus comprising:

input means, for receiving observed data containing said artifact in said observed bio-signal;

separation matrix estimation means, for estimating a separation matrix for said observed data, using an adaptive filter with optimizing a cost function that is based on a function having a monotonously increasing characteristic; and separation/extraction means for separating and extracting said observed bio-signal from said observed data by multiplying said separation matrix by said observed data.

16. The signal processing apparatus according to claim 15, wherein said observed bio-signal is at least one signal of a signal observed using magnetoencephalography or a signal observed using electroencephalography.

17. A signal processing apparatus for extracting from economic statistical data, a fluctuation element that is hidden during an observation, comprising:

input means, for receiving economic statistical data;

separation matrix estimation means, for estimating a separation matrix for said economic statistical data using an adaptive filter with optimizing a cost function that is based on a function having a monotonously increasing characteristic; and separation/extraction means, for separating and extracting said fluctuation element from said economic statistical data by multiplying said separation matrix by said economic statistical data.

18. The signal processing apparatus according to claim 17, wherein said economic statistical data, received by said input means, is management data that can be considered as the data that consists of the overall trend and individual factors synthesized by an unknown mixing matrix.

19. The signal processing apparatus according to claim 17, wherein said economic statistical data are stock price fluctuation data that are observed as a set, and said fluctuation element that is separated and extracted by said separation/extraction means is a stock price trend for an independent component that can be applied for portfolio return prediction.

20. A mobile terminal device, for receiving, from a base station for code division multiple access, observed data that include the spread information to other users, and for extracting a local user signal from said observed data, comprising:
  input means, for receiving observed data from said base station;
  separation matrix estimation means, for estimating a separation matrix for said observed data using an adaptive filter with optimizing a cost function that is further based on a function having a monotonously increasing characteristic; and
  separation/extraction means, for separating and extracting a user signal from said observed data by multiplying said separation matrix by said observed data.

21. An article of manufacture comprising a computer usable medium having computer readable program code means embodied therein for causing signal separation, the computer readable program code means in said article of manufacture comprising computer readable program code means for causing a computer to effect the steps of claim 1.

22. An article of manufacture comprising a computer usable medium having computer readable program code means embodied therein for causing signal separation, the computer readable program code means in said article of manufacture comprising computer readable program code means for causing a computer to effect the steps of claim 2.

23. An article of manufacture comprising a computer usable medium having computer readable program code means embodied therein for causing signal separation, the computer readable program code means in said article of manufacture comprising computer readable program code means for causing a computer to effect the steps of claim 3.

24. An article of manufacture comprising a computer usable medium having computer readable program code means embodied therein for causing signal separation, the computer readable program code means in said article of manufacture comprising computer readable program code means for causing a computer to effect the steps of claim 6.

25. A computer program product comprising a computer usable medium having computer readable program code means embodied therein for causing signal processing, the computer readable program code means in said computer program product comprising computer readable program code means for causing a computer to effect the functions of claim 8.

26. A computer program product comprising a computer usable medium having computer readable program code means embodied therein for causing signal processing, the computer readable program code means in said computer program product comprising computer readable program code means for causing a computer to effect the functions of claim 9.

27. A computer program product comprising a computer usable medium having computer readable program code means embodied therein for causing signal processing, the computer readable program code means in said computer program product comprising computer readable program code means for causing a computer to effect the functions of claim 10.

28. A computer program product comprising a computer usable medium having computer readable program code means embodied therein for causing signal processing, the computer readable program code means in said computer program product comprising computer readable program code means for causing a computer to effect the functions of claim 12.

29. A computer program product comprising a computer usable medium having computer readable program code means embodied therein for causing signal processing, the computer readable program code means in said computer program product comprising computer readable program code means for causing a computer to effect the functions of claim 14.

30. A computer program product comprising a computer usable medium having computer readable program code means embodied therein for causing signal processing, the computer readable program code means in said computer program product comprising computer readable program code means for causing a computer to effect the functions of claim 15.

31. A computer program product comprising a computer usable medium having computer readable program code means embodied therein for causing signal processing, the computer readable program code means in said computer program product comprising computer readable program code means for causing a computer to effect the functions of claim 17.

32. A computer program product comprising a computer usable medium having computer readable program code means embodied therein for causing functions of the mobile terminal device, the computer readable program code means in said computer program product comprising computer readable program code means for causing a computer to effect the functions of claim 20.

33. A program storage device readable by machine, tangibly embodying a program of instructions executable by the machine to perform method steps for signal processing, said method steps comprising the steps of claim 1.

34. A program storage device readable by machine, tangibly embodying a program of instructions executable by the machine to perform method steps for signal processing, said method steps comprising the steps of claim 3.

35. A program storage device readable by machine, tangibly embodying a program of instructions executable by the machine to perform method steps for signal processing, said method steps comprising the steps of claim 6.

* * * * *